United States Patent
Simari et al.

(10) Patent No.: US 10,019,837 B2
(45) Date of Patent: Jul. 10, 2018

(54) VISUALIZATION ALIGNMENT FOR THREE-DIMENSIONAL SCANNING

(71) Applicant: MICROSOFT TECHNOLOGY LICENSING, LLC, Redmond, WA (US)

(72) Inventors: Matthew Adam Simari, Seattle, WA (US); Szyman Piotr Stachniak, Redmond, WA (US); Vijay Baiyya, Redmond, WA (US); Lin Liang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/169,569

(22) Filed: May 31, 2016

(65) Prior Publication Data
US 2017/0345209 A1 Nov. 30, 2017

(51) Int. Cl.
*G06T 17/00* (2006.01)
*H04N 13/02* (2006.01)
*G06T 15/20* (2011.01)
*G01B 11/25* (2006.01)

(52) U.S. Cl.
CPC .......... *G06T 17/00* (2013.01); *G01B 11/2522* (2013.01); *G06T 15/205* (2013.01); *H04N 13/021* (2013.01)

(58) Field of Classification Search
None
See application file for complete search history.

(56) References Cited

U.S. PATENT DOCUMENTS

| | | |
|---|---|---|
| 8,754,887 B2 | 6/2014 | Kuffner et al. |
| 8,848,201 B1 | 9/2014 | Bruce et al. |
| 8,879,828 B2 | 11/2014 | Bell et al. |
| 9,031,809 B1 | 5/2015 | Kumar et al. |
| 9,091,536 B2 | 7/2015 | Hausler |
| 9,159,166 B2 | 10/2015 | Finn et al. |
| 2011/0164114 A1 | 7/2011 | Kobayashi et al. |
| 2012/0141949 A1 | 6/2012 | Bodony et al. |

(Continued)

FOREIGN PATENT DOCUMENTS

WO   2015123768 A1   8/2015

OTHER PUBLICATIONS

Barone, et al., "3D Virtual Reconstructions of Artworks by a Multiview Scanning Process", in Proceedings of 18th International Conference on Virtual Systems and Multimedia, Sep. 2, 2012, pp. 259-265.

(Continued)

*Primary Examiner* — Vu Nguyen
(74) *Attorney, Agent, or Firm* — Alleman Hall Creasman & Tuttle LLP

(57) ABSTRACT

A method for generating a three-dimensional virtual representation includes performing a first scan of the physical object while the physical object has a first position. A displayed visualization of the physical object is generated based on the first scan. Aligning input is received that causes increased correspondence between the displayed visualization and a second position of the physical object. A second scan of the physical object is performed while the object is in the second position. Based on the first scan and the second scan, a three-dimensional virtual representation of the physical object is generated.

20 Claims, 8 Drawing Sheets

(56) References Cited

U.S. PATENT DOCUMENTS

| | | |
|---|---|---|
| 2014/0104413 A1 | 4/2014 | McCloskey et al. |
| 2015/0022639 A1 | 1/2015 | Blassnig et al. |
| 2015/0172626 A1 | 6/2015 | Martini |
| 2015/0350618 A1 | 12/2015 | Meier et al. |
| 2015/0373321 A1 | 12/2015 | Bridges |

OTHER PUBLICATIONS

Marchand, et al., "Pose Estimation for Augmented Reality: a Hands-on Survey", in Proceedings of IEEE Transactions on Visualization and Computer Graphics, Dec. 30, 2015, pp. 1-18.

"International Search Report and Written Opinion Issued in PCT Application No. PCT/US2017/033716", dated Aug. 11, 2017, 10 Pages.

VISUALIZATION ALIGNMENT FOR THREE-DIMENSIONAL SCANNING

BACKGROUND

Three-dimensional scanning systems allow users to create virtual representations of physical objects. Often, multiple sequential scans must be performed to capture every feature of the object. Data generated from individual scans typically are combined via resource-intensive post-processing software to generate a complete virtual representation of the physical object.

BRIE DESCRIPTION OF THE DRAWINGS

FIG. 1 schematically depicts an example scanning system.

FIG. 2 schematically depicts an example scanning system.

FIG. 3 schematically depicts scanning of a physical object by a scanning system.

FIG. 4 schematically depicts generation of a displayed visualization based on a first scan of a physical object.

FIG. 5 schematically illustrates alignment between a physical object and a displayed visualization.

FIG. 6 schematically illustrates alignment between a physical object and a displayed visualization.

Figure 9:
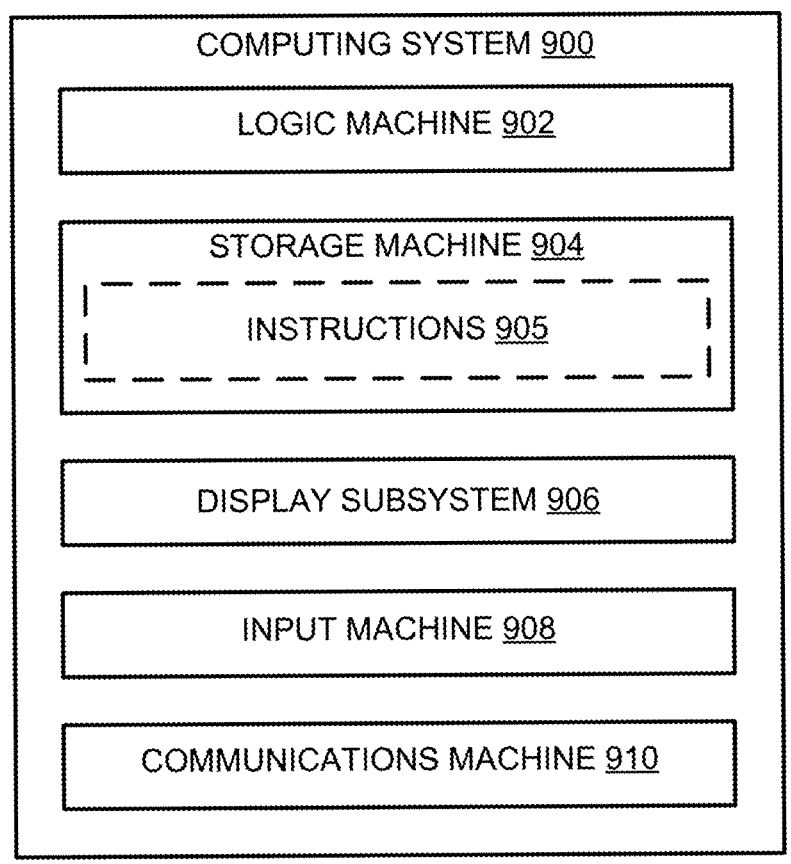

FIG. 9 schematically depicts an example computing system.

DETAILED DESCRIPTION

Three-dimensional scanning technologies allow users to scan and generate virtual 3D representations (e.g., 3D models) of physical objects (e.g., via depth/infrared/RGB cameras or other optical sensors). Such virtual representations may take the form of data structures or other computer-readable data stored on a computing device, and may be used to produce visualizations of the object that can be viewed and manipulated by users of the computing device. For example, a user may scan a physical object from the real world, to enable a simulated version of the object to appear in a virtual/augmented reality setting, movie, video game, etc, or for use in fabricating/synthesizing copies of the scanned object. Visualizations based on virtual representations may be displayed in a variety of ways. For example, a visualization of a scanned object may be viewed as an image shown on a display device, or projected as a "hologram" by a suitable head-mounted display or other hologram-generating display system. It will be appreciated that, as used herein, "physical object" may refer to any inanimate object, living thing, collection of objects (e.g., room, environment, setting), and/or any other suitable compositions of matter.

A physical object may include one or more features that are difficult or impossible to capture with a single scan. For example, scanning of a physical object may be done by orbiting an optical sensor around the object, traveling in a 360-degree arc. However, it may be difficult for such a scan to capture the top and bottom sides of the object, as well as other features of the object which may be occluded from some angles due to the shape or position of the object, or the nature of the scanning environment. Accordingly, after performing a scan of a physical object, a user may need to move the physical object to a new position, and perform one or more subsequent scans of the object in order to capture any features of the object not visible during the first scan.

Each scan of a physical object yields data associated with those portions of the physical object that were visible during the scan. Accordingly, a series of scans of a physical object in different positions will yield multiple datasets. Each dataset may describe the physical object from different perspectives or views, depending on how the physical object or scanning sensor was moved from scan to scan. However, with no information regarding how the physical object was moved between scans, it typically will be necessary to carry out a resource-intensive post-processing operation to stitch the data together and generate an accurate and usable 3D model. In addition to consuming significant resources, the post-processing operations may need to be attended by a person with special technical expertise, and there often will be a significant delay between the scanning operations and when the 3D model becomes available for use.

The present disclosure therefore relates to a technique for scanning physical objects that quickly produces 3D virtual representations without requiring the resource-intensive post-processing described above. Specifically, after performing a first scan of a physical object, a user is presented with a displayed visualization of the physical object based on the first scan. Prior to performing a second scan, the user may move the physical object to occupy a second position. The user also may provide an aligning input to cause an increased correspondence between the displayed visualization and the second position of the physical object. The user may provide aligning input by rotating the displayed visualization to be generally aligned with the second position, and/or moving the physical object to be generally aligned with a displayed visualization previously rotated either by the user or the system. After the user provides the aligning input, a second scan is performed, and a 3D virtual representation of the physical object is generated based on the first scan and the second scan. Receipt of aligning input provided by a user allows a computing system performing the scans and/or or interpreting scan results to understand how the physical object was moved between scans, significantly reducing the difficulty associated with combining data generated through multiple scans into a complete 3D virtual representation of the physical object. Accordingly, a 3D virtual representation of a physical object may be rapidly generated and viewed/manipulated after scanning a physical object, and without requiring a user to perform post-processing or manual combination of partial visualizations.

Figure 1:
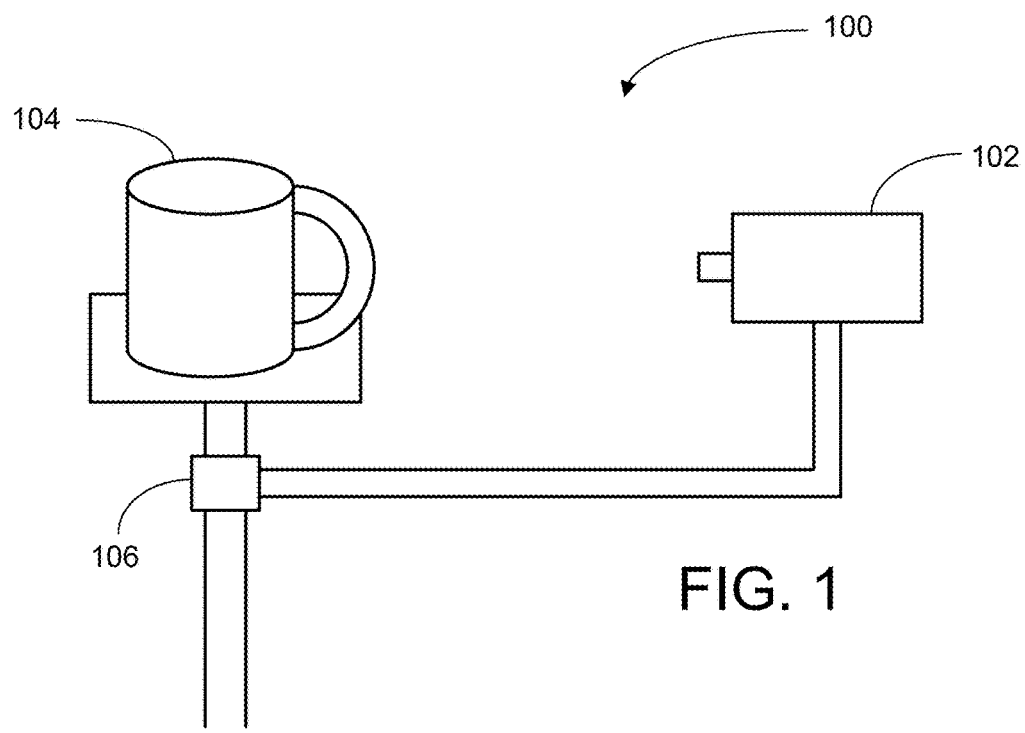

FIG. 1 schematically shows an example scanning system 100 that may be used for scanning physical objects as described herein. Scanning system 100 includes an object scanner 102 configured to scan a physical object 104. Scanning system 100 and the functionality described herein may be used in connection with any 3D object. Scanning system 100 is not intended to limit the present disclosure, and it will be appreciated that the scanning techniques described herein may be achieved with any suitable scanning hardware.

Object scanner 102 may include one or more cameras configured to detect visible light reflected off physical object 104. Additionally, or alternatively, object scanner 102 may include a depth camera. Generally, any mechanism/technology may be used that is configured to facilitate scanning of objects via detecting reflections from the object.

In the depicted example, supports for object scanner 102 and physical object 104 are attached at pivot 106. During scanning of the physical object, pivot 106 may allow components of scanning system 100, such as object scanner 102, to move around physical object 104 while the physical object is stationary. For example, object scanner 102 may move around physical object 104 along a 360-degree circular are, thereby allowing object scanner 102 to image each face of physical object 104 facing the object scanner. In other examples, object scanner 102 may remain stationary while physical object 104 rotates relative to pivot 106, allowing object scanner 102 to image each face of physical object 104 as the physical object rotates. In addition to or instead of the depicted pivot/supports, any method may be employed to achieve relative motion between the scanner and physical object.

Figure 2:
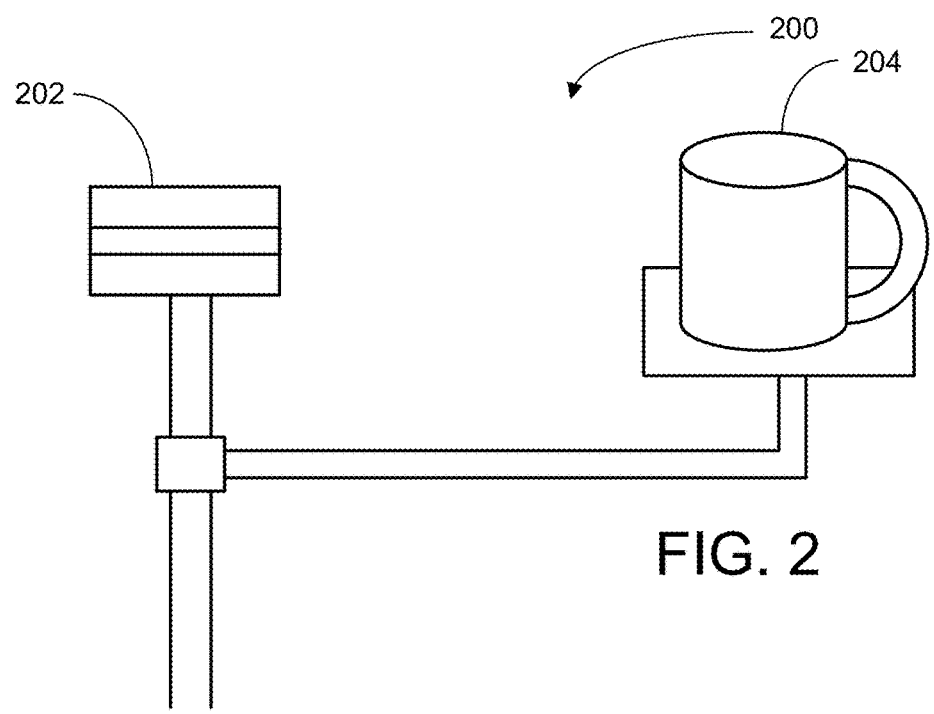

FIG. 2 schematically depicts another example scanning system 200 that may be used to scan physical objects. As with scanning system 100, scanning system 200 includes an object scanner 202 configured to scan a physical object 204 via any suitable sensing mechanism.

As shown in FIG. 2 supports for object scanner 202 and physical object 204 are configured to permit physical object 204 to rotate relative to one or more components of scanning system 200, such as object scanner 202, via a rotating turntable for example. As such, object scanner 202 may remain stationary while physical object 204 rotates relative to it, ultimately presenting each face of physical object 204 to object scanner 200.

Scanning systems 100 and 200 may be integrated into and/or operatively coupled with one or more computing systems, which may control operation of the scanning systems and/or receive data from scanning systems during/after scan operations. In some implementations, scan data generated by scanning systems may be processed by one or more components of the scanning system, and/or exported for processing by other computing systems. As described above, a single scan of a physical object by a scanning system may not be sufficient to image every feature of the physical object. Accordingly, a scanning system may be configured to output multiple sets of scan data for multiple scans of the same physical object, and such datasets may be combined, either by the scanning system or an external computer. As described herein, steps associated with processing, aligning, and generating virtual representations may be performed by a scanning system, and/or by one or more computing systems operatively coupled to and/or associated with such a scanning system. For example, scanning systems 100 and/or 200 may be integrated into and/or usable with computing system 900 described below with respect to FIG. 9, which may receive scan data and aligning input, and perform processing of scan data as described herein.

It will be appreciated that scanning systems 100 and 200 are illustrated schematically, and presented only as non-limiting examples. The object scanning techniques described herein may be used with virtually any hardware capable of scanning 3D physical objects, and such hardware may include any number of components, utilizing any suitable technologies.

Figure 3:
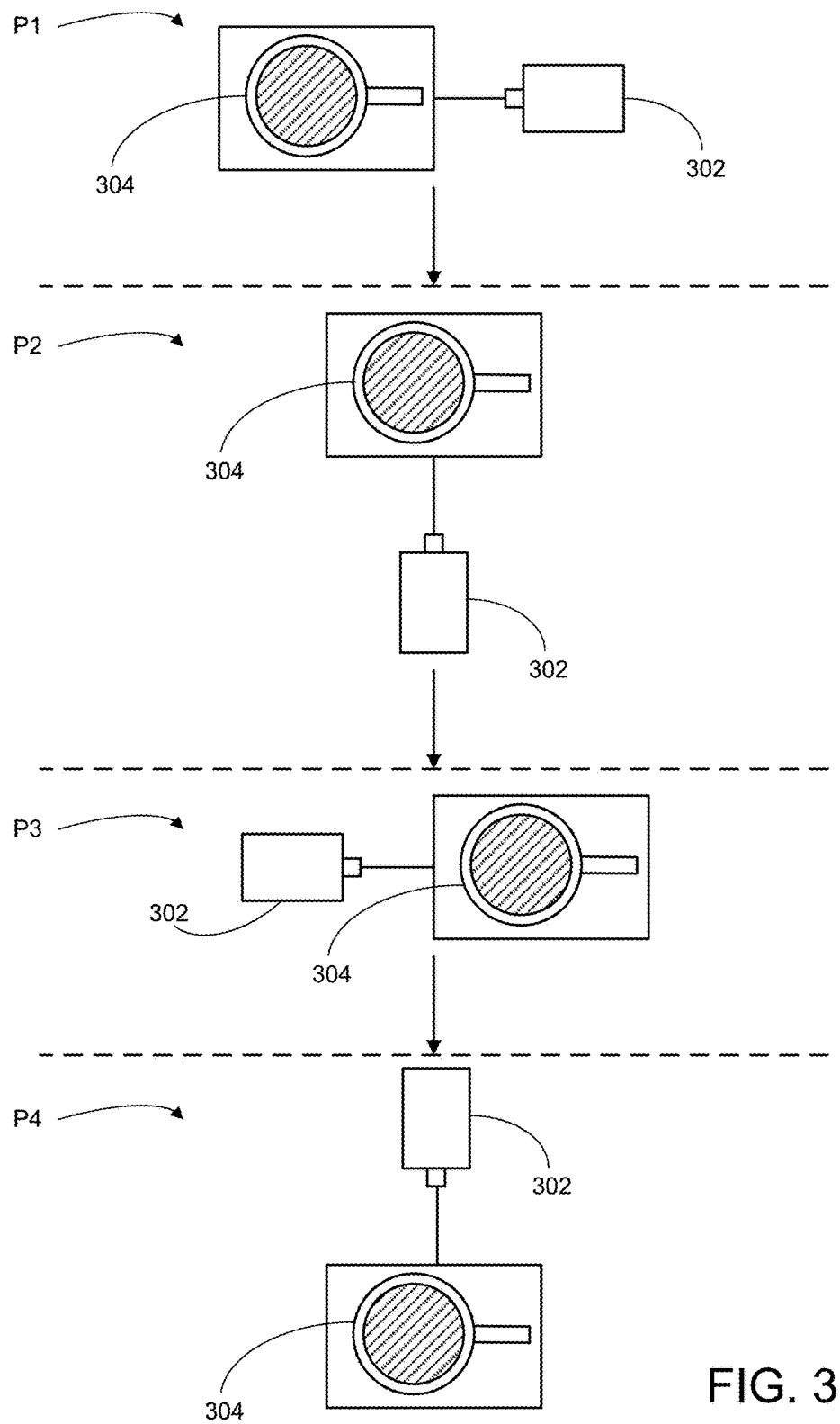

FIG. 3 schematically illustrates the process of scanning a physical object with a scanning system. It will be appreciated that the process shown in FIG. 3 may be repeated multiple times per scan. Also, the process shown in FIG. 3 may be repeated for multiple subsequent scans of the same physical object, where the position of the physical object is changed from scan to scan. Based on the multiple scans, as well as alignment input received from a user, a 3D virtual representation of the physical object may be generated, as will be described below.

At position 1 (P1), FIG. 3 shows an object scanner 302 and a physical object 304. Object scanner 302 may be a component of a scanning system, such as scanning system 100 and/or scanning system 200. Accordingly, during scanning of the physical object, one or both of object scanner 302 and physical object 304 may move relative to the other, allowing the object scanner to image multiple sides/faces of the physical object. Specifically, as shown in FIG. 3, object scanner 302 is moving relative to physical object 304.

At position 2 (P2), object scanner 302 has moved 90 degrees clockwise relative to physical object 304. Accordingly, features of physical object 304 not visible to the object scanner at 300 are now visible. At position 3 (P3), object scanner 302 has moved another 90 degrees clockwise, and is now 180 degrees from its starting position. At position 4 (P4), object scanner is 270 degrees from its starting position, allowing the object scanner to view additional features of physical object 304 not visible to the object scanner at P1, P2, or P3. After P4, object scanner 302 may move back to P1. At this point the scan may end, or alternatively the above process may repeat, in order to improve the resolution of the resulting scan data, for example.

It will be appreciated that P1, P2, P3, and P4 are presented as isolated moments in time, and that the object scanner may continuously move throughout the scanning operation without stopping at any particular position. FIG. 3 is only intended to convey that components of the scanning system may move during scanning, and that such movement allows for comprehensive scanning of a physical object. The object scanner may additionally occupy any suitable position relative to the physical object at scan start/end, not just the position shown at P1. Further, while FIG. 3 shows object scanner 302 moving clockwise in a circular path through two dimensions, in other implementations, other movement patterns may be utilized. For example, the object scanner may move counter-clockwise, through non-circular paths, through one-dimensional or three-dimensional paths, etc.

Figure 4:
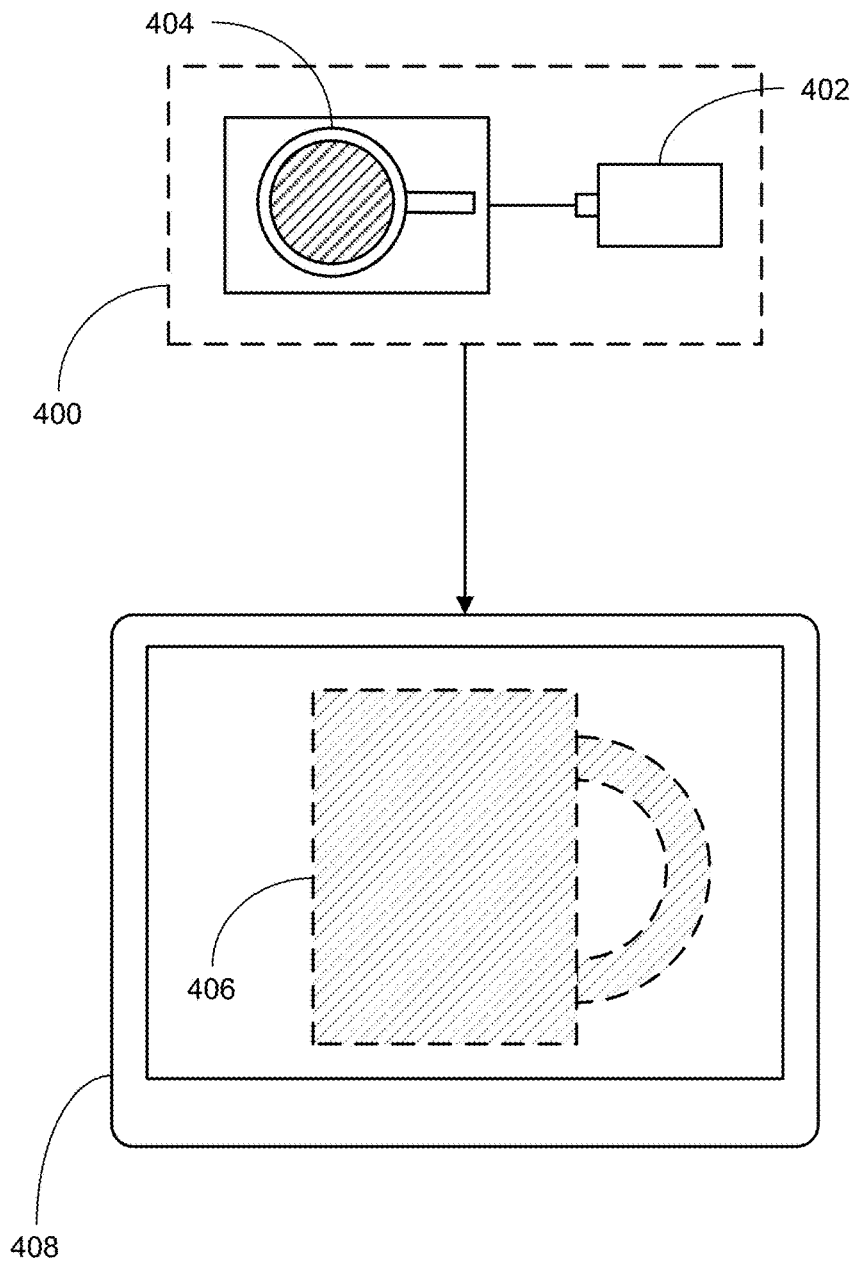

Data produced during a scan of a physical object by a scanning system, such as that shown in FIG. 3, may produce a set of computer-readable data describing the physical object as imaged by the scanning system during the scan. This data may be thought of as comprising a preliminary, or partial virtual representation that will ultimately be completed via data obtained from one or more additional scans. In any case, data from one or more non-final scans may be used to produce a visualization of the physical object based on the scan(s), which may be presented to a user. This is shown in FIG. 4, which depicts a scan 400. Scan 400 includes an object scanner 402 and a physical object 404, and is intended to serve as a graphical representation of a complete scan of the physical object. As an example, scan 400 may represent the scanning process shown in FIG. 3, or any other suitable 3D scan of a physical object.

Also shown in FIG. 4 is a displayed visualization 406. Responsive to performing scan 400, a scanning system may generate displayed visualization 406 of physical object 404 based on scan 400. Displayed visualization 406 is displayed by a display 408, which may be a component of a scanning system, a component of a computing system operatively coupled to a scanning system, and/or otherwise capable of receiving and displaying visualizations of physical objects. In other implementations, displayed visualization 406 may be displayed in other suitable ways. For example, displayed visualization 406 may be projected as a hologram by a head mounted display device, and/or other suitable hologram projector. Though displayed visualization 406 is shown as a two-dimensional image, it will be appreciated that a displayed visualization as described herein may be constructed based on 3D scan data. Accordingly, responsive to user input, displayed visualization 406 may be moved/rotated to view other sides/faces of the physical object imaged during scan 400. A number of suitable input modalities may be available to the user, including mouse and keyboard interfaces, voice control, gesture control, touch-sensitive displays, etc.

Displayed visualization 406 shows physical object 404 as imaged by object scanner 402 during scan 400. Accordingly, displayed visualization 406 may not include data for sides/faces/features of physical object 404 not visible to object scanner 402 during scan 400. It may therefore be desirable to take subsequent scans of the physical object while the physical object occupies different positions. For example, after performing a first scan of the physical object while the physical object is in a first position, the user may take a second scan while the object is in a second position. The second scan may capture one or more features of the physical object not captured by the first scan based on the difference between the first and second positions, and this may be used to generate a more complete visualization of the physical object.

However, as described above, it can be challenging to combine data from multiple scans of the same physical object when the position of the physical object changes between scans. A computing system interpreting scan data from multiple scans of a physical object may not have information regarding how the physical object was moved between scans. Accordingly, in order to align the independent datasets, the computing system may be required to calculate an enormous number of potential correspondences between the sets of scan data. Accordingly, a user may provide aligning input that causes increased correspondence between a displayed visualization and a new position of a physical object, in order to help align the displayed visualization with the new position. This may limit the number of calculations/operations that the computing system must perform before the independent datasets can be combined.

Figure 5:
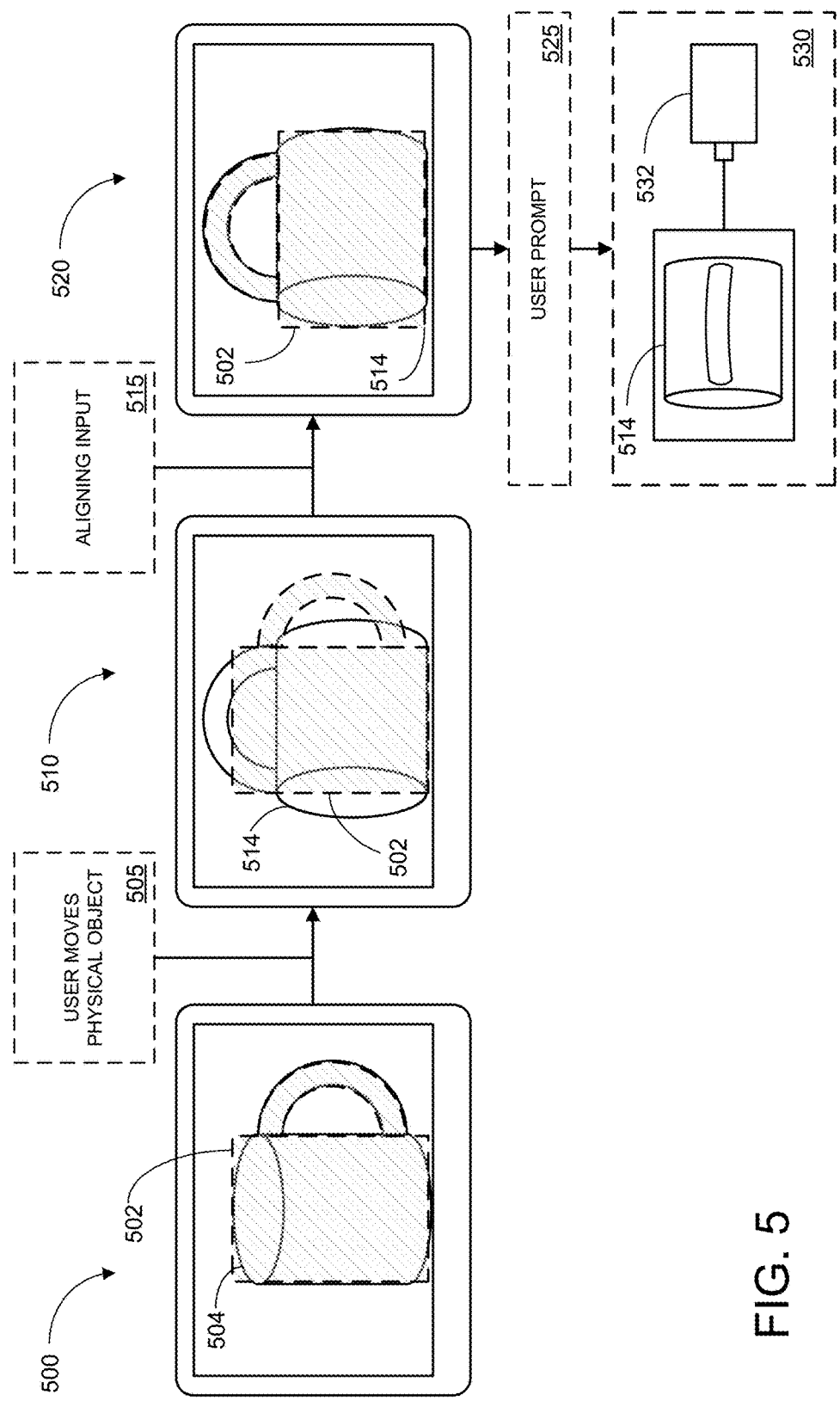

Such alignment may be generally done in two different ways: either alignment can be user-initiated, or system initiated. FIG. 5 schematically illustrates user-initiated alignment between a displayed visualization and a second position of a physical object. Specifically, at 500, FIG. 5 shows a displayed visualization 502, and a physical object occupying a first position 504. Displayed visualization 502 may be generated after performing a first scan, such as scan 400, of the physical object while it occupies first position 504. Displayed visualization 502 is presented via a display, and is superimposed over a dynamically updating image of the physical object. In this manner, the user may alter the positions of one or both of the physical object and the displayed visualization, while easily observing their positions relative to each other.

At 505, the user moves the physical object to a second position. The user may choose any suitable second position for the physical object, though in general it is desirable to choose the second position such that, during a subsequent scan of the physical object, one or more features of the physical object will be visible to the scanning system that were not visible during the first scan.

At 510, displayed visualization 502 remains unchanged, while the physical object has been moved to a second position 514. From the second position, the scanning system may image both the bottom side and the interior cavity of the physical object, both of which were not easily visible to the scanning system while the physical object was in the first position.

At 515, the scanning system receives aligning input provided by the user. Aligning input may take a variety of suitable forms. In one example, the aligning input causes rotating of the displayed visualization. In this manner, the user may help the scanning system to establish a common coordinate system for scan data generated during the first and second scans, greatly simplifying the process of combining multiple scans into a complete 3D virtual representation of the physical object. A number of suitable input modalities may be available to the user, including mouse and keyboard interfaces, voice control, gesture control, touch-sensitive displays, etc., and the user may make use of any of these input modalities when providing aligning input.

At 520, displayed visualization 502 has rotated and now matches the second position 514 of the physical object. In some cases, it may be difficult for the user to precisely align the displayed visualization with the second position of the physical object. Accordingly, the scanning system may be configured to automatically align the displayed visualization with the second position under certain circumstances. For example, after the user moves the physical object to the second position, the scanning system may begin continuously attempting to align the displayed visualization with the second position. As the scanning system receives aligning input, and correspondence between the displayed visualization and the second position increases, the scanning system may identify the correct position for the displayed visualization, and automatically align the displayed visualization with the second position. Additionally, or alternatively, after providing the aligning input, the user may prompt the scanning system to align the displayed visualization with the second position.

In some implementations, the user may move the displayed visualization 502 before moving the physical object to the second position. Accordingly, rather than rotate the displayed visualization to match the second position, the user may rotate the displayed visualization toward an anticipated second position of the physical object. In this case, the user may provide aligning input by moving the physical object, rather than moving the displayed visualization. For example, after rotating the displayed visualization, the user may move the physical object to a second position approximately corresponding to the rotated position of the displayed visualization. The scanning system may observe (e.g., via one or more cameras) as the user moves the physical object, and interpret input from the cameras as aligning input. After the user has moved the physical object to the second position, alignment as described above may continue.

Prior to performing the second scan, the user may optionally provide a user prompt at 525, confirming that the displayed visualization is closely aligned with the second position of the physical object. This may be useful in the event that the scanning system performs an improper alignment, which may be easily visible to the user via the display. In the event that an improper alignment occurs, the user may be given the opportunity to correct the alignment, via providing additional aligning input, for example. Alternatively, the scanning system may immediately perform the second scan after aligning the displayed visualization with the second position, which may provide for a more automated and streamlined approach to object scanning.

At 530, the scanning system performs a second scan of the physical object. As shown, the scanning system includes an object scanner 532, and the physical object is occupying the second position 514. Notably, during the second scan, one or more features of the physical object may be visible to the object scanner that were not visible during the first scan.

Figure 6:
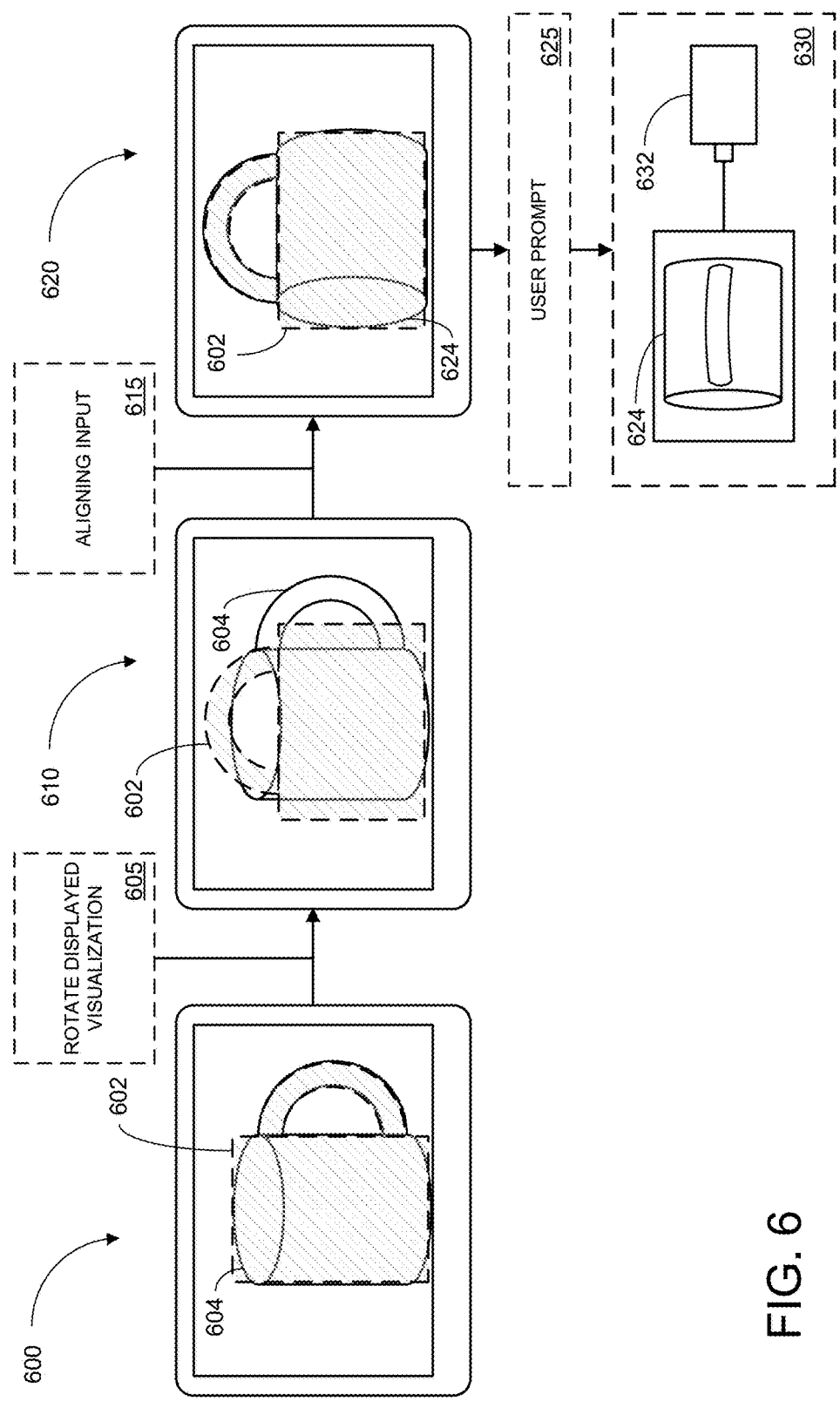

FIG. 6 schematically illustrates system-initiated alignment between a displayed visualization and a second position of a physical object. Specifically, at 600, FIG. 6 shows a displayed visualization 602, and a physical object occupying a first position 604. Displayed visualization 602 may be generated after performing a first scan, such as scan 400, of the physical object while it occupies first position 604. Displayed visualization 602 is presented via a display, and is superimposed over a dynamically updating image of the physical object. In this manner, the user may alter the positions of one or both of the physical object and the displayed visualization, while easily observing their positions relative to each other.

At 605, the scanning system rotates the displayed visualization. This may serve as a prompt to the user to rotate the physical object to match the displayed visualization. For example, based on the first scan, the scanning system may attempt to identify sides/features/faces of the physical object which were poorly visible during the first scan, and instruct the user to move the physical object such that the identified features would be clearly visible during the second scan.

At 610, the physical object still occupies the first position 604, while the displayed visualization 602 has been rotated. The displayed visualization may therefore serve as an approximate indicator of an ideal second position of the physical object. In other words, the system may instruct the user how to rotate the physical object for efficient scanning by rotating the displayed visualization.

At 615, the system receives aligning input from the user. In this case, the user may move the physical object to a second position that approximately matches the position of the rotated displayed visualization, and the aligning input may take the form of the user's movement of the physical object. For example, the scanning system may observe (e.g., via one or more cameras) as the user moves the physical object to the second position. Accordingly, the aligning input may be generated based on repositioning of the physical object, bringing the physical object into increased correspondence with the rotated displayed visualization.

At 620, the physical object has moved to a second position 624 that approximately matches the position of the rotated displayed visualization. As with user-initiated alignment, it may be difficult for the user to precisely align the displayed visualization with the second position of the physical object. Accordingly, the scanning system may be configured to automatically align the displayed visualization with the second position under certain circumstances. For example, after the user moves the physical object to the second position, the scanning system may begin continuously attempting to align the displayed visualization with the second position. As the scanning system receives aligning input, and correspondence between the displayed visualization and the second position increases, the scanning system may identify the correct position for the displayed visualization, and automatically align the displayed visualization with the second position. Additionally, or alternatively, after providing the aligning input, the user may prompt the scanning system to align the displayed visualization with the second position.

As with user-initiated alignment, at 625, the user may optionally provide a prompt confirming that the displayed visualization is closely aligned with the second position of the physical object.

At 630, the scanning system performs a second scan of the physical object. As shown, the scanning system includes an object scanner 632, and the physical object is occupying the second position 624. Notably, during the second scan, one or more features of the physical object may be visible to the object scanner that were not visible during the first scan.

A second scan of the physical object, such as second scans 530 and 630, may be performed in substantially the same manner as the first scan, except for the altered position of the physical object. For example, a second scan of a physical object may utilize substantially the same process as the one illustrated in FIG. 3.

After performing the first and second scans of the physical object, the scanning system may generate a 3D virtual representation of the physical object based on the first and second scans. This may be facilitated via receipt of aligning input as described above, which may enable the scanning system to establish a common coordinate system for scan data generated via separate scans. Accordingly, the difficulty and time required to generate a complete 3D representation of a physical object may be reduced, as the user will not be required to manually combine partial visualizations during post-processing. Rather, the scanning system may rapidly generate a 3D virtual representation which may be viewed and/or manipulated by one or more users as a visualization, and/or exported for use in other applications/by other computing systems.

Figure 7:
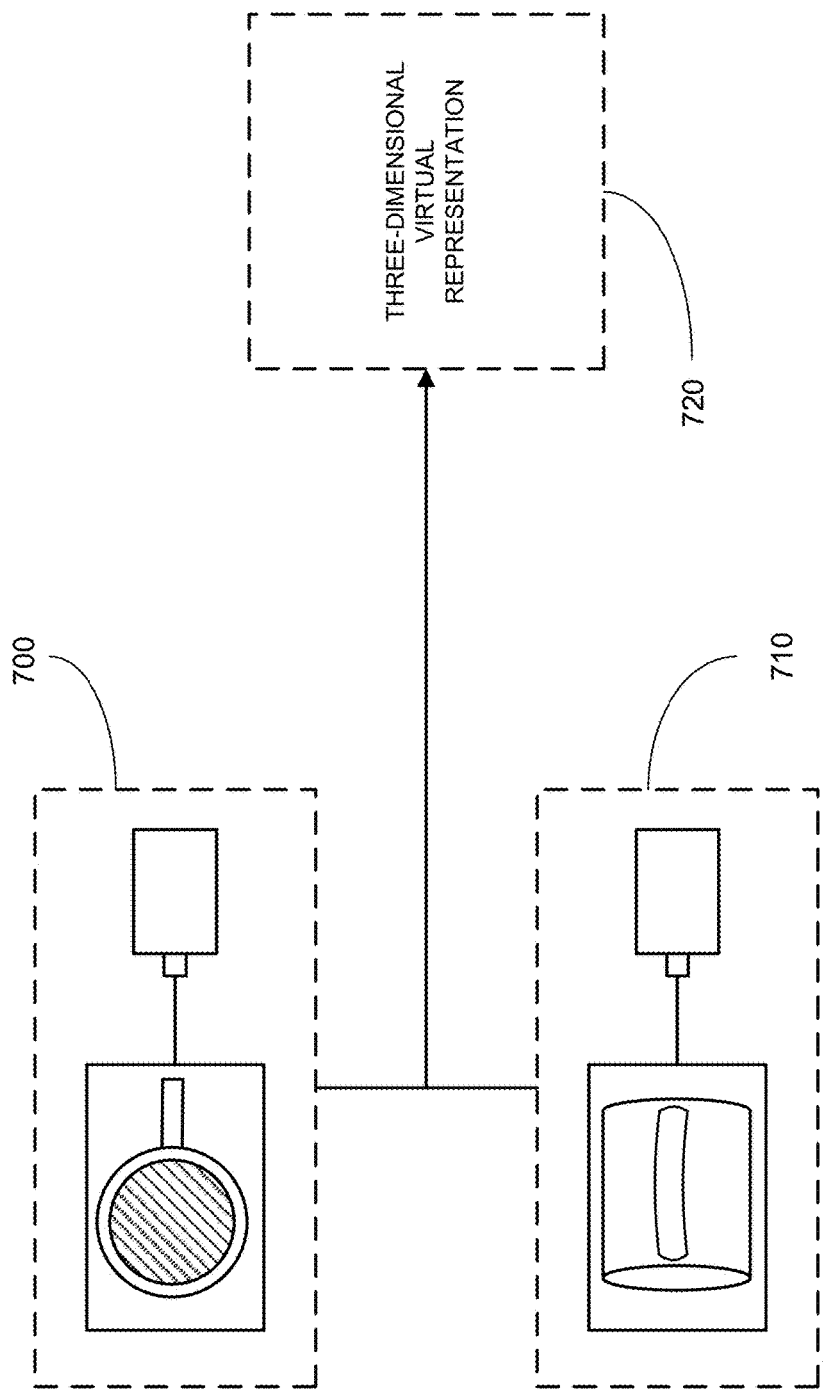
FIG. 7 depicts generating a three-dimensional virtual representation of a physical object based on first and second scans of the physical object.

Generation of a 3D virtual representation is schematically illustrated in FIG. 7. Specifically, FIG. 7 shows a first scan 700, and a second scan 710. First scan 700 may be performed as described above with respect to FIG. 3, and/or via alternate scanning processes capable of capturing 3D scan data of a physical object. After performing first scan 700, alignment may take place between a displayed visualization and a second position of the physical object. Accordingly, second scan 710 may be performed after user-initiated or system-initiated alignment, as described above. Based on first scan 700 and second scan 710, the scanning system may generate 3D virtual representation 730. Such generation may be done in a variety of suitable ways. For example, generating a 3D virtual representation may include performing an iterative closest point (ICP) process, and/or using one or more other algorithms/processes suitable for combining 3D scan data.

In some implementations, the scanning system may perform one or more additional scans after the second scan and prior to generating the 3D virtual representation. Before each subsequent scan, the user may move the physical object to occupy a new position, allowing each subsequent scan to image features of the physical object not visible during previous scans. Accordingly, the 3D virtual object may be generated based on the first scan, the second scan, and the one or more additional scans.

Figure 8:
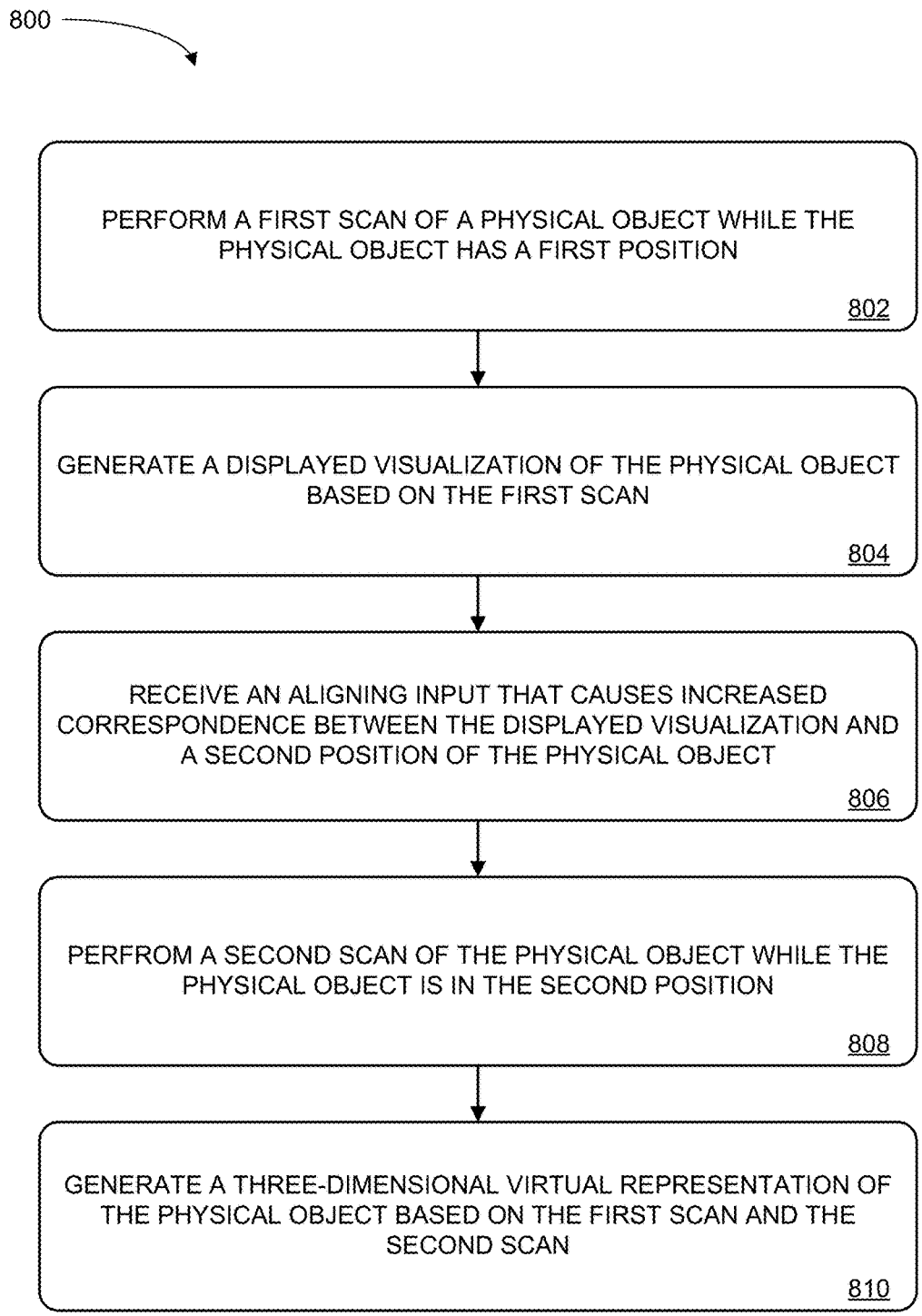
FIG. 8 illustrates an example method for generating a three-dimensional virtual representation of a physical object.

FIG. 8 illustrates an example method 800 for generating a 3D virtual representation of a physical object. At 802, method 800 includes performing a first scan of a physical object while the physical object has a first position. This may be carried out by a scanning system as described above. During the first scan, the physical object may remain stationary as one or more components of the scanning system move around the physical object. Alternatively, the physical object may rotate relative to one or more components of the scanning system.

At 804, method 800 includes generating a displayed visualization of the physical object based on the first scan. The displayed visualization may show features of the physical object imaged during the first scan. The displayed visualization may be superimposed over a dynamically updating image of the physical object.

At 806, the method includes receiving an aligning input that causes increased correspondence between the displayed visualization and a second position of the physical object. This may result in alignment between the displayed visualization and the second position. Such alignment may be user-initiated, or system-initiated.

At 808, method 800 includes performing a second scan of the physical object while the physical object is in the second position. The second scan may be carried out in a substantially similar manner to the first scan, and may capture one or more features of the physical object not captured during the first scan based on a difference between the first and second positions.

At 810, the method includes generating a 3D virtual representation of the physical object based on the first scan and the second scan. Such a 3D virtual representation may be viewed and/or manipulated by a user quickly after scanning is complete, and may be added to one or more virtual/augmented reality settings, video games, movies, etc.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 9 schematically shows a non-limiting embodiment of a computing system 900 that can enact one or more of the methods and processes described above. Computing system 900 may perform one or more of the 3D virtual representation generation steps described above. For example, computing system 900 may be an integral part of a scanning system usable for scanning physical objects, and/or computing system 900 may be operatively coupled with such a scanning system. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), scanning systems, and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions, such as instructions 905, executable by the logic machine to implement the methods and processes described herein. For example, instructions 905 may be executable by logic machine 902 to perform one or more of the scanning, aligning, and virtual representation steps described above. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In an example, a method for generating a three-dimensional virtual representation of a physical object via a scanning system comprises: performing a first scan of the physical object while the physical object is in a first position; generating a displayed visualization of the physical object based on the first scan; receiving an aligning input that causes increased correspondence between the displayed visualization and a second position of the physical object; performing a second scan of the physical object while the physical object is in the second position; and generating a three-dimensional virtual representation of the physical object based on the first scan and the second scan. In this example or any other example, the method further comprises performing one or more additional scans of the physical object and generating the three-dimensional virtual representation of the physical object based on the first scan, the second scan, and the one or more additional scans. In this example or any other example, responsive to receiving the aligning input, the displayed visualization and the second position of the physical object are aligned. In this example or any other example, the displayed visualization and the second position of the physical object are aligned responsive to receiving a prompt from a user of the scanning system. In this example or any other example, the method further comprises rotating the displayed visualization, and the aligning input (i) is received after the rotating of the displayed visualization and (ii) generated based on a repositioning of the physical object that brings the physical object into increased correspondence with the rotated displayed visualization. In this example or any other example, the method further comprises rotating the displayed visualization, where the aligning input is received from a user of the scanning system and causes the rotating of the displayed visualization. In this example or any other example, a user of the scanning system moves the physical object to occupy the second position. In this example or any other example, the second scan captures one or more features of the physical object not captured by the first scan as a result of a difference between the first position and the second position. In this example or any other example, the scanning system includes a depth camera. In this example or any other example, generating the three-dimensional virtual representation includes performing an iterative closest point process based on the first scan and the second scan.

In an example, a computing system comprises: a logic machine; and a storage machine holding instructions executable by the logic machine to: generate a displayed visualization of a physical object based on a first scan of the physical object performed by a scanning system while the physical object is in a first position; receive an aligning input that causes increased correspondence between the displayed visualization and a second position of the physical object; and generate a three-dimensional virtual representation of the physical object based on the first scan and a second scan of the physical object performed by the scanning system while the physical object is in the second position. In this example or any other example, during the first scan and the second scan, the physical object is stationary and one or more components of the scanning system move around the physical object. In this example or any other example, during the first scan and the second scan, the physical object rotates relative to one or more components of the scanning system. In this example or any other example, the displayed visualization is presented to a user of the computing system via a display, and is superimposed over a dynamically updating image of the physical object. In this example or any other example, a user of the computing system moves the physical object to occupy the second position. In this example or any other example, responsive to receiving the aligning input, the displayed visualization and the second position of the physical object are aligned. In this example or any other example, the instructions are further executable to rotate the displayed visualization, where the aligning input (i) is received after the displayed visualization is rotated and (ii) generated based on a repositioning of the physical object that brings the physical object into increased correspondence with the rotated displayed visualization. In this example or any other example, the instructions are further executable to rotate the displayed visualization, where the aligning input is received from a user of the computing system and causes rotation of the displayed visualization. In this example or any other example, the second scan captures one or more features of the physical object not captured by the first scan as a result of a difference between the first position and the second position.

In an example, a computing system comprises: a scanning system; a logic machine; and a storage machine holding instructions executable by the logic machine to: via the scanning system, perform a first scan of a physical object while the physical object has a first position; generate a displayed visualization of the physical object based on the first scan; present the displayed visualization to a user of the computing system via a display, the displayed visualization superimposed over a dynamically updating image of the physical object; receive an aligning input from the user of the computing system that causes rotation of the displayed visualization toward a second position of the physical object; via the scanning system, perform a second scan of the physical object while the physical object is in the second position; and generate a three-dimensional virtual representation of the physical object based on the first scan and the second scan.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for generating a three-dimensional virtual representation of a physical object via a scanning system, the method comprising:
    performing a first scan of the physical object while the physical object is in a first position;
    receiving an aligning input that causes increased correspondence between a displayed visualization of the physical object and a second position of the physical object, such aligning input including (1) moving the displayed visualization to match the second position of the physical object or (2) moving the physical object into the second position to match with the displayed visualization;
    performing a second scan of the physical object while the physical object is in the second position; and
    generating a three-dimensional virtual representation of the physical object based on the first scan and the second scan.

2. The method of claim 1, further comprising performing one or more additional scans of the physical object and generating the three-dimensional virtual representation of the physical object based on the first scan, the second scan, and the one or more additional scans.

3. The method of claim 1, where responsive to receiving the aligning input, the displayed visualization and the second position of the physical object are aligned.

4. The method of claim 3, where the displayed visualization and the second position of the physical object are aligned responsive to receiving a prompt from a user of the scanning system.

5. The method of claim 1, further comprising rotating the displayed visualization, and where the aligning input (i) is received after the rotating of the displayed visualization and (ii) generated based on a repositioning of the physical object that brings the physical object into increased correspondence with the rotated displayed visualization.

6. The method of claim 1, further comprising rotating the displayed visualization, where the aligning input is received from a user of the scanning system and causes the rotating of the displayed visualization.

7. The method of claim 1, where a user of the scanning system moves the physical object to occupy the second position.

8. The method of claim 1, where the second scan captures one or more features of the physical object not captured by the first scan as a result of a difference between the first position and the second position.

9. The method of claim 1, where the scanning system includes a depth camera.

10. The method of claim 1, where generating the three-dimensional virtual representation includes performing an iterative closest point process based on the first scan and the second scan.

11. A computing system, comprising:
    a logic machine; and
    a storage machine holding instructions executable by the logic machine to:
        receive data for a first scan of a physical object performed by a scanning system while the physical object is in a first position;
        receive an aligning input that causes increased correspondence between a displayed visualization of the physical object and a second position of the physical object, such aligning input including (1) moving the displayed visualization to match the second position of the physical object or (2) moving the physical object into the second position to match with the displayed visualization; and
        generate a three-dimensional virtual representation of the physical object based on the first scan and a second scan of the physical object performed by the scanning system while the physical object is in the second position.

12. The computing system of claim 11, where during the first scan and the second scan, the physical object is stationary and one or more components of the scanning system move around the physical object.

13. The computing system of claim 11, where during the first scan and the second scan, the physical object rotates relative to one or more components of the scanning system.

14. The computing system of claim 11, where the displayed visualization is presented to a user of the computing system via a display, and is superimposed over a dynamically updating image of the physical object.

15. The computing system of claim 11, where a user of the computing system moves the physical object to occupy the second position.

16. The computing system of claim 11, where responsive to receiving the aligning input, the displayed visualization and the second position of the physical object are aligned.

17. The computing system of claim 11, the instructions further executable to rotate the displayed visualization, where the aligning input (i) is received after the displayed visualization is rotated and (ii) generated based on a repositioning of the physical object that brings the physical object into increased correspondence with the rotated displayed visualization.

18. The computing system of claim 11, the instructions further executable to rotate the displayed visualization, where the aligning input is received from a user of the computing system and causes rotation of the displayed visualization.

19. The computing system of claim 11, where the second scan captures one or more features of the physical object not captured by the first scan as a result of a difference between the first position and the second position.

20. A computing system, comprising:
    a scanning system;
    a logic machine; and
    a storage machine holding instructions executable by the logic machine to:
        via the scanning system, perform a first scan of a physical object while the physical object has a first position;
        generate a displayed visualization of the physical object based on the first scan;
        present the displayed visualization to a user of the computing system via a display, the displayed visualization superimposed over a dynamically updating image of the physical object;

receive an aligning input from the user of the computing system that causes rotation of the displayed visualization toward a second position of the physical object;
via the scanning system, perform a second scan of the physical object while the physical object is in the second position; and
generate a three-dimensional virtual representation of the physical object based on the first scan and the second scan.

* * * * *